(Model.)
I. W. HEYSINGER.
HOLDER FOR GLASS CUTTING TOOLS.
No. 526,444. Patented Sept. 25, 1894.
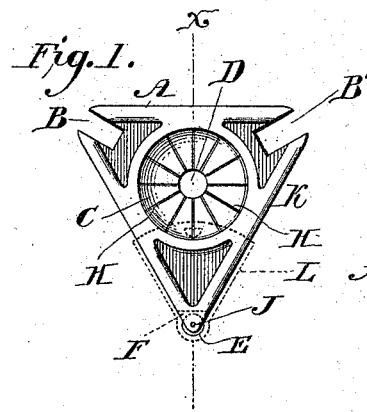
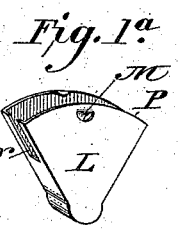
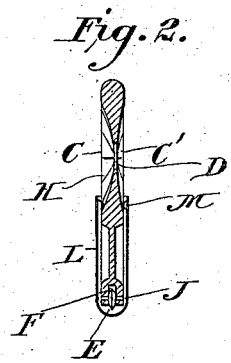
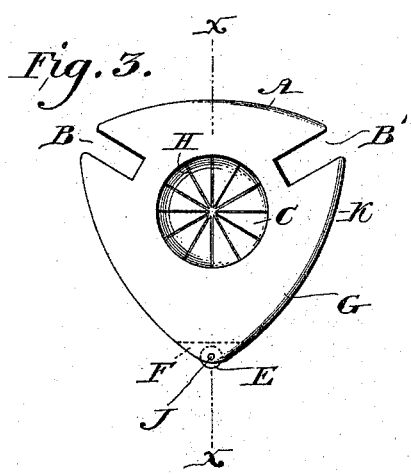
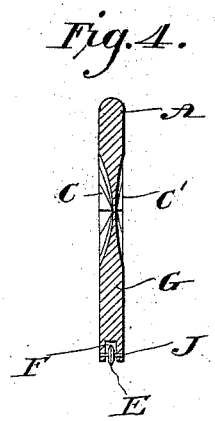
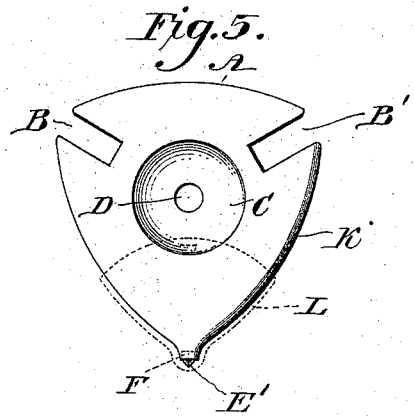
Witnesses:
Inventor.
Isaac W. Heysinger.

UNITED STATES PATENT OFFICE.

ISAAC W. HEYSINGER, OF PHILADELPHIA, PENNSYLVANIA.

HOLDER FOR GLASS-CUTTING TOOLS.

SPECIFICATION forming part of Letters Patent No. 526,444, dated September 25, 1894.

Application filed June 6, 1894. Serial No. 513,620. (Model.)

*To all whom it may concern:*

Be it known that I, ISAAC W. HEYSINGER, a citizen of the United States, residing at Philadelphia, in the county of Philadelphia and State of Pennsylvania, have invented a certain new and useful Improvement in Tool-Holders for Glass-Cutting Tools, of which the following is a full, clear, and exact description, reference being had to the drawings which accompany and form a part of this specification, in which—

Figure 1 is a front view of a tool holder and glass cutter embodying my invention. Fig. 1ª is a perspective view of a case for covering the cutter. Fig. 2, is a transverse section along the dotted line x—x of Fig. 1. Fig. 3, is a modification in form of Fig. 1. Fig. 4 is a transverse section of Fig. 3 along the dotted line x—x thereof; and Fig. 5 is a front view of one of my glass cutter tool holders in which a diamond is used for a cutter, instead of the small roller cutter shown in the other figures.

The lettering in all the figures is uniform.

My invention relates to the construction of a tool holder for glass cutting tools, the whole forming for use a glass cutting device adapted to be carried in the pocket like a piece of money or the like, broad and flat in shape and with comparatively smooth margins and surfaces, and which is adapted in use to be so held by the hand of the operator as to be as secure in position as the ordinary long stemmed holders in general use, and which tool is also more easily and conveniently used, especially by those unskilled in the use of such tools, than those generally used, and in which the glass breaking slots, by which the marked or cut glass is broken off from the sheet, are conveniently placed around the margin of the tool holder, so as to be brought into a proper front position for use by simple rotation of the flat holder as held between the thumb and finger of the operator.

My invention consists essentially of the device above described, and as shown in the drawings, and which, for further illustration I describe as follows:

A is a flat plate of metal, which I prefer to make triangular or nearly triangular in form, though other marginal shapes may be employed, if desired. To facilitate its use I form a depression, C, near the middle of each side of the plate, C C', though one concavity may be deeper than the other, or may be dispensed with, though I do not prefer to do so. These concavities, C C', permit the thumb of the operator to rest in one, and the first finger in the opposite one, and then, if the middle finger be hooked over the part of the periphery, K, the cutter may be drawn across the surface of the glass, making a cut along the same, without rotation of the holder, the glass cutting tool extending down perpendicularly beneath the thumb and finger hold. Of course the tool holder may be held otherwise if preferred. In the middle of the concavity I usually provide a hole, D, Figs. 1 and 3, for convenience in hanging the tool on a nail, or for nickel plating it, or the like, but, as shown in the other figures, I do not always do so.

At the upper angles of the holder, or at corresponding points upon its periphery I form the indented slots, B, and B', one larger than the other, to accommodate glass of different thicknesses. When the glass has been cut, by merely rotating the tool holder upon the thumb and first finger as a pivot, either one of the slots, B or B', will be brought forward for use, and the cutter afterward brought into play again in the same manner.

To assist in preventing the rotation of the tool holder in the hand, when in use, I prefer to score the double concavity, C, C', radially outward, as shown at H, H, Figs. 1 and 2, or otherwise roughen it, though I do not always do so. It is a material advantage however as it increases the elasticity of the hold in the hand, and the certainty of the cut. In Figs. 1 and 2 I also show the flat surfaces of the tool holder paneled out for lightness of weight, but in the other figures the surfaces are left plain.

The cutters, in Figs. 1, 2, 3, and 4, are of the ordinary roller type with margins beveled to an edge, and made of hardened steel. E, E, E, represent these cutting wheels which are inserted in the slots, F, and held, free to rotate therein, by the pivot pins, J, J.

In Fig. 5 I show a diamond permanently set in, at E'.

Either sort of cutter may be used.

In Figs. 1, 1ª, and 2, I show a small case, preferably of struck up sheet metal, open at N, Fig. 1ª, and having a free spring margin, P, with an indent, M. This cover may be pushed on to any corner of the triangle, A, and the indent, M, engaging within the margins of the concavities, C and C', as shown in Fig. 2, will hold the cover in place. This cover I prefer to use to protect the glass cutter wheel from injury or the weather. The same is shown applied to Fig. 5, but in this figure it is not shown as interchangeable with other parts of the periphery. As shown in Fig. 1 however, when removed from the cutter, E, for use of the tool as a glass cutter, it may be pressed on one of the other corners and so prevented from accidental loss.

I prefer to construct the tool holder of cast metal, such as brass, iron or steel, though other materials may be used, and suitably finish it by nickle plate, bronze, or the like.

I do not rigidly confine myself to the specific peripheral or sectional forms shown in the figures, but vary the same according to special requirements. I also sometimes leave the sides plain, and in other cases letter or otherwise figure or ornament the surfaces, as may be desired.

Having now described my invention, what I claim, and desire to secure by Letters Patent, is—

1. In combination with glass cutting tool, E, a holder for the same consisting of a flat plate slotted in one part for the reception of said glass cutter, having a doubly recessed center, and opposite glass breaking indentations in the margin thereof at opposite sides of the enlarged upper end of said plate, substantially as described.

2. A tool holder for glass cutting tools consisting of a substantially triangular plate of metal having glass cutter slot at one angle, and a glass breaking indentation at each of the other angles, substantially as described.

3. A glass cutter holding tool consisting of a flat triangular plate of metal having a central concavity on the opposite sides of the middle part thereof, and adapted to receive a glass cutting tool at one angle thereof, and provided with one or more glass breaking indentations, substantially as described.

4. In combination with a triangularly shaped plate of metal having a glass cutter at one apex thereof, a sliding triangularly shaped cover adapted to be placed over said glass-cutter when not in use, and secured thereto by friction of said cover, and to be interchangeably placed over one or the other apex of said triangle when said glass cutter tool is in use, substantially as described.

5. As an article of manufacture a tool holder for glass-cutters, consisting of flat plate, A, double concave recess, C C', hole D, glass breaking slots B B', and glass cutter slot, F, together with glass cutter tool inserted therein, and adapted to be operated by means of said flat plate by the thumb and fingers, of the operator thereof, applied to the sides of said flat plate, substantially as described.

ISAAC W. HEYSINGER.

Witnesses:
M. B. FENNINGER,
JOHN R. NOLAN.